United States Patent [19]

Marsh, Jr. et al.

[11] 4,335,470

[45] Jun. 15, 1982

[54] AUDIO DE-EMPHASIS CIRCUIT

[75] Inventors: James C. Marsh, Jr.; Marcus L. Snell, Jr., both of Indianapolis, Ind.

[73] Assignee: RCA Corporation, New York, N.Y.

[21] Appl. No.: 201,829

[22] Filed: Oct. 29, 1980

[51] Int. Cl.$^3$ ............................................... H04B 1/10
[52] U.S. Cl. .................................... 455/205; 179/1 D; 455/43; 455/312
[58] Field of Search ................ 179/1 D, 1 P; 455/43, 455/205, 307, 312; 333/28 R

[56] References Cited

U.S. PATENT DOCUMENTS

| | | | |
|---|---|---|---|
| 2,299,388 | 10/1942 | Hansell | 455/43 |
| 3,339,026 | 8/1967 | Csicsatka | 455/205 |
| 4,198,540 | 4/1980 | Cizek | 179/1 D |
| 4,282,402 | 8/1981 | Liontonia | 179/1 D |

OTHER PUBLICATIONS

*Frequency Modulation Receivers,* A. B. Cook and A. A. Liff, 1968, pp. 59-60 and 383-386.
The 1978 RCA Linear Integrated Circuits, pp. 337-339.

*Primary Examiner*—Marc E. Bookbinder
*Attorney, Agent, or Firm*—Paul J. Rasmussen; William H. Meagher; W. Brinton Yorks, Jr.

[57] ABSTRACT

The de-emphasis function of an FM audio system is provided by the impedances of the sound reproduction components, including an audio output transformer and the speaker. The high frequency rolloff of these impedance devices can provide complete FM de-emphasis by using an audio output transformer with a selected leakage inductance and a speaker with a selected voice coil impedance. If the inductances of the components are insufficient to provide the full amount of compensating rolloff, the remaining portion of the de-emphasis can be provided by a partial de-emphasis circuit coupled between the FM detector and the transformer or speaker. In addition, the provision of the de-emphasis function at the output of the audio power amplifier provides filtering of the objectionable high frequency harmonics resulting from power amplifier clipping. A transformer which exhibits sufficient leakage inductance for the entire de-emphasis function will generally provide a substantially increased inductance in shunt with the audio signal path. The low frequency (bass) response of the audio system is thereby improved.

9 Claims, 8 Drawing Figures

AUDIO DE-EMPHASIS CIRCUIT

This invention relates to audio de-emphasis circuits and, in particular, to the use of the leakage inductance of an audio output transformer and/or the speaker impedance to form all or part of the FM de-emphasis function in an FM audio system.

In order to improve the signal-to-noise ratio of an FM signal, broadcasters normally preemphasize the signal at the transmitter. The preemphasis refers to the boosting of the relative amplitude of the modulating voltage with increase in frequency for higher audio frequencies, from 2000 Hz to approximately 15 kHz. In a television sound or FM receiver, it is desirable to attenuate these higher frequencies by the same amount they were boosted, thereby improving the signal-to-noise ratio at the higher frequencies. When both the audio signal and noise are attenuated in the receiver by the proper amount, the result of the attenuation, or de-emphasis, is to return the audio signal response to a relatively flat amplitude versus frequency response.

In the United States, the Federal Communications Commission specifies that television sound preemphasis shall be provided in accordance with the impedance-frequency characteristic of an LR network having a time constant of 75 $\mu$sec. This allows a receiver manufacturer to provide a de-emphasis circuit with a time constant of 75 $\mu$sec, but with an opposite characteristic, so that the amplitudes of the higher frequency signals are attenuated in a complementary manner.

The de-emphasis circuit is customarily connected at the output of the FM detector. The compensated, detected signal is then amplified by an audio power amplifier and applied to a loudspeaker for reproduction of the audio information. After de-emphasis, the quality of the audio reproduction is governed principally by the characteristics of the audio power amplifier and the speaker. Of the two, the speaker characteristics will generally have the more substantial impact on audio reproduction. The speaker will usually be comprised of a voice coil and an iron or steel core which is magnetized. If the magnet is large enough, it will completely saturate the voice coil with flux. When the coil is driven in a saturated condition, the effective inductance of the coil will be substantially decreased, which permits accurate reproduction of a broad bandwidth audio signal.

If the speaker contains a small magnet, complete saturation of the coil with flux may not be achieved. The speaker will then present a large inductance load to the audio power amplifier. The large inductance of the voice coil will attenuate high frequency signals. The bandwidth of the reproduced signals will be significantly reduced as high frequencies are rolled off.

In addition, an audio output transformer may be interposed between the power amplifier and the speaker to provide impedance matching or isolation of the speaker from an electrically hot chassis. The series leakage inductance of the transformer will also roll off higher frequency signals, thereby limiting the bandwidth of the system in a like manner as the speaker.

Finally, the audio power amplifier can produce distortion at high volume levels. At these high volume levels, a transistor power amplifier can be driven sufficiently hard so that signal peaks are clipped. Hard clipping of the signal peaks can produce audible high frequency harmonics in the output signal. These harmonic frequencies can have components appearing in the 3-10 kHz range, in which the ear is most sensitive to distortion.

In accordance with the principles of the present invention, the series inductance at the output of the audio power amplifier, including the transformer leakage and speaker inductances, is advantageously used to provide all or part of the de-emphasis function of the FM audio system. The high frequency rolloff of these inductances can provide complete FM de-emphasis by using an audio output transformer with a selected leakage inductance and a speaker with a selected impedance. If the inductances are insufficient to provide the full amount of compensating rolloff, the remaining portion of the de-emphasis can be provided by a partial de-emphasis circuit coupled between the FM detector and the transformer or speaker. The high frequency rolloff of the transformer and speaker inductances are thus used to produce a wide band system. In addition, the location of these inductances at the output of the audio power amplifier provides filtering of the objectionable high frequency harmonics resulting from power amplifier clipping. Finally, a transformer which exhibits sufficient leakage inductance for the entire de-emphasis function will generally provide a substantially increased inductance in shunt with the audio signal path. The low frequency (bass) response of the audio system is governed in part by the size of this shunt inductance, providing improved bass response. Thus, the system will also be characterized by improved low frequency performance.

Figure 1:
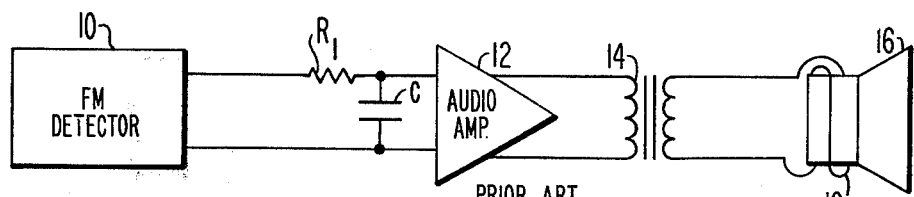
FIG. 1 illustrates in schematic and block diagram form a typical prior art de-emphasis circuit.

A typical prior art FM de-emphasis network is shown in FIG. 1. An FM detector 10 produces a detected audio signal, which is applied by the de-emphasis network, including a resistor $R_1$ and a capacitor C, to an audio amplifier 12. The amplified audio signal is applied to a voice coil 16a of a speaker 16 by way of an audio output transformer 14. The time constant for the de-emphasis network is 75 $\mu$sec, and the network consists of a single-section lowpass filter.

Figure 5:
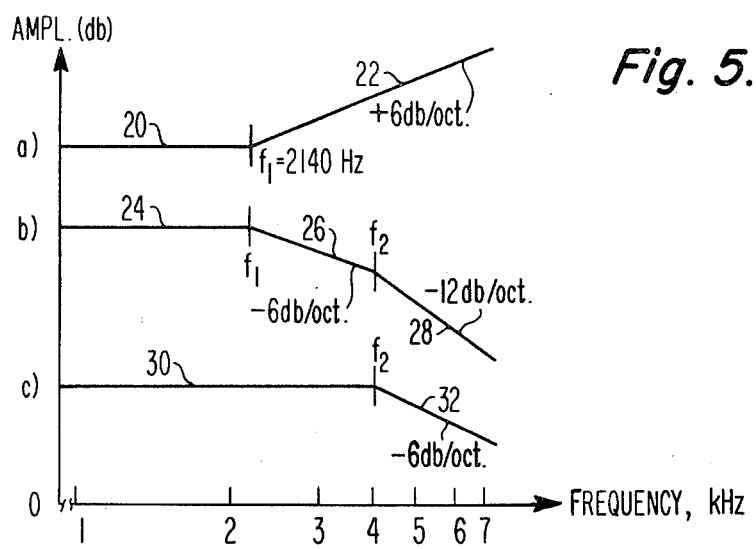
FIG. 5 is a Bode plot of the arrangement of FIG. 1.

Typical response curves for the FM system of FIG. 1 are shown in FIG. 5. FIG. 5a shows the response curve of an FM signal with preemphasis. The lower frequency portion 20 of the response curve is flat. Above a break frequency $f_1$ of 2140 Hz, the preemphasis provides a signal level increase at the rate of +6 db per octave over the response portion 22.

In the receiver, the lower frequency portion 24 of the response curve is again flat, as shown in FIG. 5b. The de-emphasis network provides a compensating rolloff of −6 db per octave over a portion 26 of the response curve above break frequency $f_1$. However, above a higher frequency $f_2$, the transformer and speaker inductances provide a further rolloff, which in this example is assumed to be −6 db per octave. The resultant rolloff above frequency $f_2$ is the combination of the effects of both the de-emphasis network and the transformer and speaker inductances, or −12 db per octave. When the de-emphasis curve of FIG. 5b is combined with the preemphasis curve of FIG. 5a, a system bandwidth results as shown in FIG. 5c. The rolloff caused by the transformer and speaker inductances causes the audio bandwidth to roll off above frequency $f_2$ at the rate of −6 db per octave, as indicated by portion 32 of the response curve of FIG. 5c.

Figure 2:
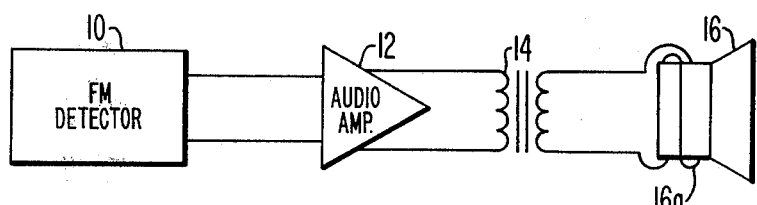
FIG. 2 illustrates in schematic and block diagram form an audio system which provides FM de-emphasis in accordance with the principles of the present invention.
Figure 6:
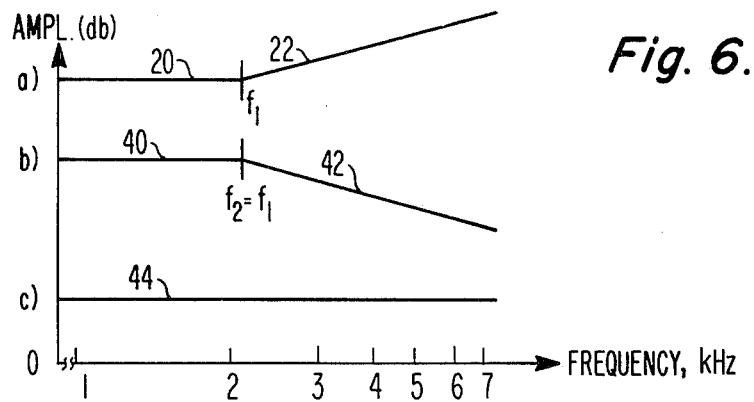
FIG. 6 is a Bode plot of the arrangement of FIG. 2.

In FIG. 2, FM de-emphasis is provided by the leakage inductance of the audio output transformer 14 and the impedance of the speaker coil 16a. The arrangement of FIG. 2 thus is the same as that of FIG. 1, except that the conventional de-emphasis network $R_1$ C is eliminated. The Bode plots of FIG. 6 illustrate the performance of the FIG. 2 arrangement. The preemphasis curve of FIG. 6a is the same as that of FIG. 5a. The inductance of the transformer 14 and the impedance of the speaker coil 16a are chosen to provide rolloff above frequency $f_2$ which is equal to the preemphasis break frequency $f_1$ as shown in FIG. 6b. The result of the preemphasis and de-emphasis curves is illustrated by response curve 44 of FIG. 6c, which shows a flat frequency response for the audio system.

Figure 3:
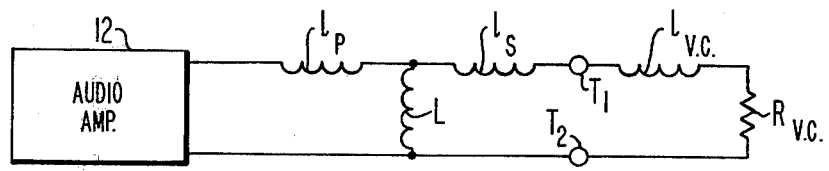
FIG. 3 illustrates in schematic and block diagram form an equivalent circuit of the arrangement of FIG. 2.

The characteristics of the transformer 14 and the speaker 16 must be chosen to cooperate to produce the desired break frequency $f_2 = f_1$. This is done in accordance with the equivalent circuit of the transformer 14 and speaker 16, illustratively shown in FIG. 3. The transformer 14 exhibits a primary winding series leakage inductance $l_p$ and a secondary winding series leakage inductance $l_s$. The main or low frequency inductance L is in shunt with the signal paths. The transformer is coupled to the speaker at terminals $T_1$ and $T_2$. The speaker exhibits a voice coil inductance $l_{v.c.}$ and a voice coil resistance $R_{v.c.}$. These values will determine the break frequency $f_2$ (i.e., the −3 db rolloff frequency) in accordance with the equation:

$$f_2 = R_{v.c.}/2\pi[l_p + l_s + l_{v.c.}] \quad (1)$$

where the voice coil resistance is in units of ohms, and the inductances are in units of henries. If the resistances of the transformer windings are significant as compared to the voice coil resistance, they should be taken into consideration and added to the voice coil resistance, $R_{v.c.}$.

The above equation (1) applies to all transformer/speaker combinations in general, and may be applied directly to a system using a 1:1 transformer. If a step-up or a step-down transformer is used, the equation may be referenced to the primary winding of the transformer by multiplying the secondary impedances, including the voice coil impedances, by the square of the ratio of the number of primary winding turns to the number of secondary winding turns.

In practice, it has been found that the impedance of widely available speakers is generally too high, and the leakage inductance of available transformers is usually too low, so that $f_2$ would otherwise be located at a higher than desired frequency $f_2$, as shown in FIGS. 5b and 5c. In order to move break frequency $f_2$ down to its desired frequency location, it has been found most expedient to use a transformer 14 with a larger than average leakage inductance. The leakage inductance of the transformer is increased by increasing the number of turns in the transformer windings. The increased number of turns also increases the main inductance L of FIG. 3, which governs bass response of the system. The systems which have been built and tested with high leakage inductance transformers have been found to exhibit improved bass response as compared with prior art circuits.

Figure 4:
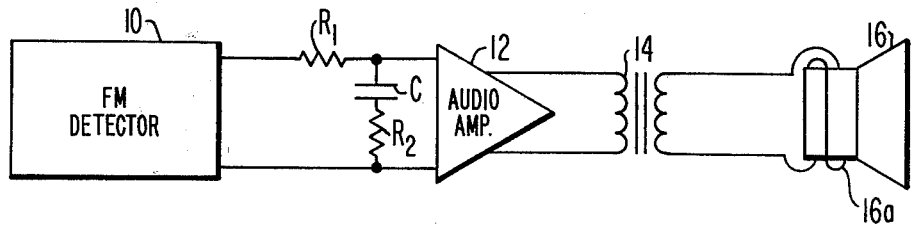
FIG. 4 illustrates in schematic and block diagram form an alternate embodiment of the present invention in which a transformer and speaker provide a portion of the de-emphasis function.

If it is desirable to use a readily available speaker, or a speaker and transformer combination which exhibits a break frequency $f_2$ which is higher than $f_1$, an RC circuit can be used to provide a portion of the de-emphasis function with the speaker or transformer/speaker combination providing the remaining portion of the de-emphasis, as shown in FIG. 4. A resistor $R_1$ is coupled in series between the FM detector 10 and the audio amplifier 12, and the series combination of a capacitor C and a resistor $R_2$ is coupled in shunt across the signal paths following resistor $R_1$. The output of the audio amplifier 12 is coupled to the audio output transformer 14, which is then coupled to the speaker 16, as before.

Figure 7:
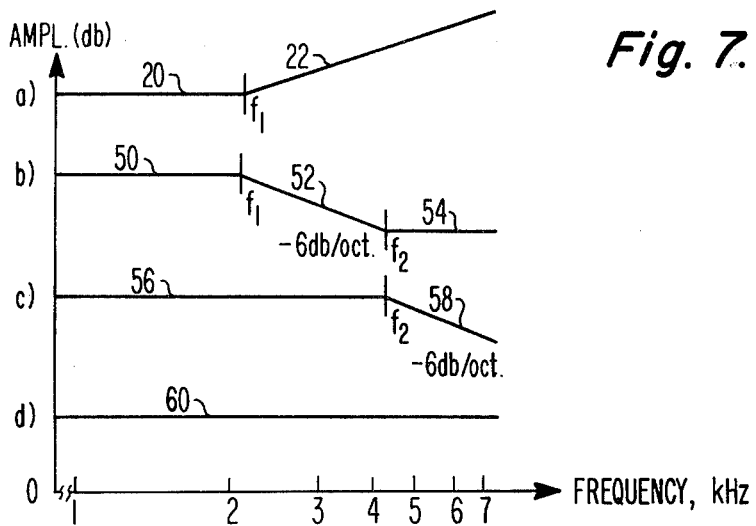
FIG. 7 is a Bode plot of the arrangement of FIG. 4.

The detected audio signal exhibits the response curve shown in FIG. 7a, including a portion 22 which exhibits the effect of preemphasis. The transformer 14 exhibits primary and secondary leakage inductances $l_p$ and $l_s$, and the speaker exhibits a voice coil resistance $R_{v.c.}$ and a voice coil inductance $l_{v.c.}$. Applying these values to equation (1), the transformer/speaker combination is found to exhibit a response curve shown in FIG. 7c, in which a portion 58 of the response curve rolls off at the rate of −6 db per octave above a frequency $f_2$. Since $f_2$ is higher than break frequency $f_1$ of the preemphasis curve of FIG. 7a, additional compensation is required between frequencies $f_1$ and $f_2$.

The additional compensation is provided by the two-section lowpass filter $R_1$-C-$R_2$ at the output of the FM detector. This lowpass filter will provide a substantially flat response at low frequencies, as shown by the portion 50 of the response curve of FIG. 7b. At frequency $f_1$, the combination of resistor $R_1$ and capacitor C will provide a break frequency, above which the signal amplitude rolls off at the rate of −6 db per octave, as shown by portion 52 of the response curve. At a higher frequency $f_2$, this rolloff is stopped by the effect of resistor $R_2$ on the lowpass filter, and the filter exhibits a substantially flat response over the remaining portion 54 of the response curve above frequency $f_2$.

The combination of the lowpass filter response curve of FIG. 7b and the transformer/speaker response curve of FIG. 7c provides a rolloff of signals above frequency $f_1$ at the rate of −6 db per octave, thereby providing the proper amount of de-emphasis. The combination of the preemphasis curve of FIG. 7a and the partial de-emphasis curves of FIGS. 7b and 7c results in a substantially flat system response as shown in FIG. 7d.

The transformer and voice coil inductances of the arrangement of FIG. 2 provide filtering of high frequency harmonics at the output of the audio amplifier under high volume clipping conditions, which is also true to a lesser extent of the embodiment of FIG. 4. The effect of the inductances is to roll off harmonics above frequency $f_2$, which rounds the clipped peaks of the high level output signal. Harmonics of lower frequencies are attenuated in the embodiment of FIG. 2 as compared with the FIG. 4 embodiment, since the break frequency $f_2$ of FIG. 6 is at a lower frequency than break frequency $f_2$ of FIG. 7.

Figure 8:
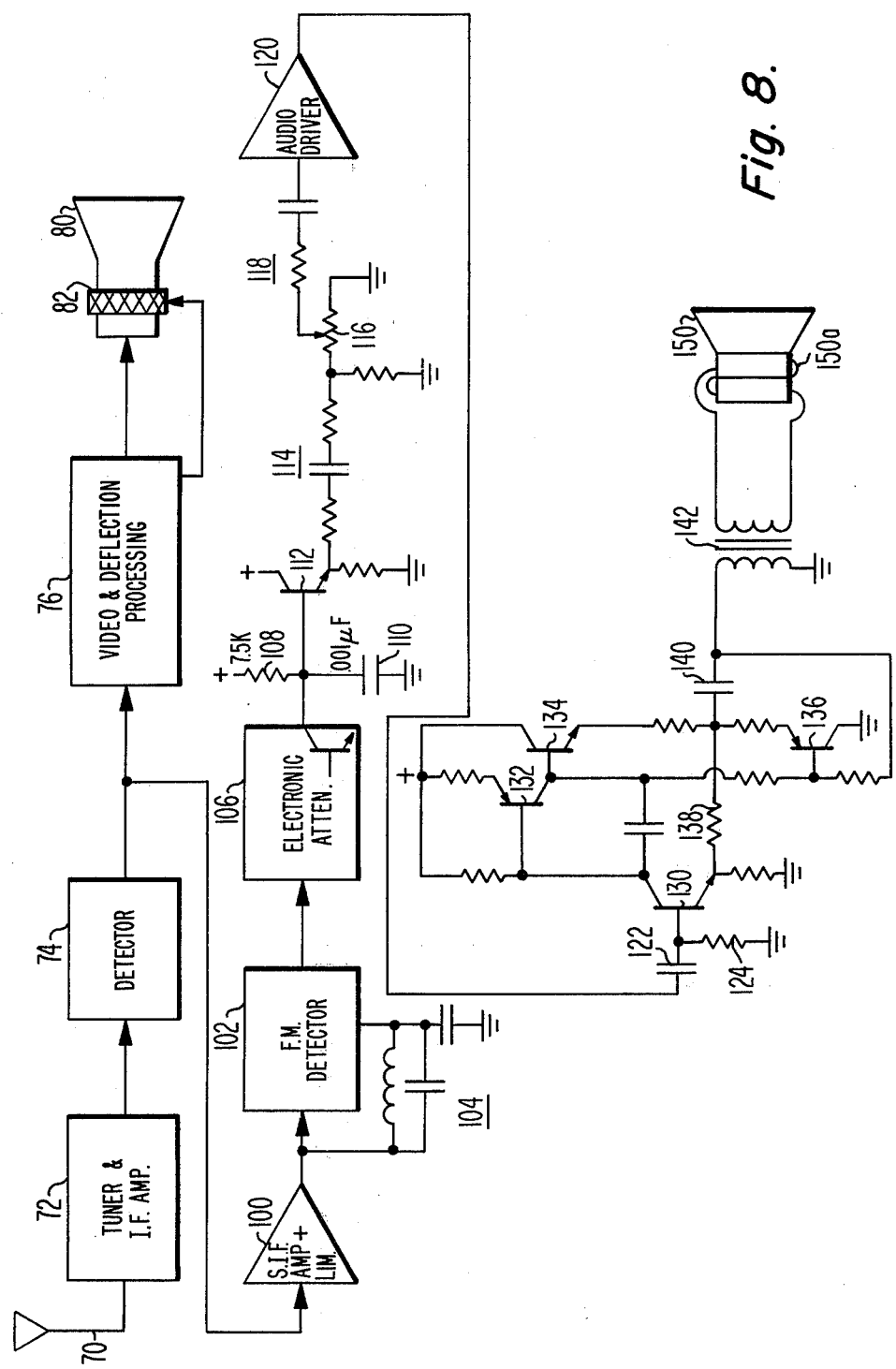
FIG. 8 illustrates in schematic and block diagram form a television receiver constructed in accordance with the principles of the present invention.

The provision of de-emphasis in accordance with the principles of the present invention in the audio section of a television receiver is shown in the embodiment of FIG. 8. Television signals received by an antenna 70 are applied to a tuner and intermediate frequency amplifier section 72. Intermediate frequency signals are coupled from the tuner and I.F. amplifier section 72 to a detector 74, which produces baseband video signals and a sound intermediate frequency (intercarrier sound) signal. The video signals are processed by video and deflection processing circuitry 76, which applies video information and deflection waveforms to the kinescope 80 and the yoke 82.

The sound I.F. signal at the output of the detector 74 is applied to the input of a sound I.F. amplifier and limiter 100. The amplified and limited sound I.F. signal is applied to an FM detector 102 and discriminator network 104 for the generation of audio frequency signals. The audio signals are coupled by an electronic attenuator 106 to a filter including a resistor 108 and a capacitor 110 which is coupled between a source of supply voltage and ground. This filter provides r.f. filtering which rolls off components of the unmodulated sound I.F. signal (4.5 MHz in the NTSC system) at this point. The filtered audio signals are then buffered by an emitter-follower coupled transistor 112 and coupled by a coupling network 114 to a volume control potentiometer 116. The arm of the volume control potentiometer 116 is coupled by a further coupling network 118 to an audio driver 120, which produces a low level audio signal.

The low level audio signal is applied to the base of a preamplifier transistor 130 by way of a coupling capacitor 122 and a base bias resistor 124. Amplified signals at the collector of preamplifier transistor 130 are applied to the base of a predriver transistor 132, which supplies signals to complementary driver transistors 134 and 136. A.C. and D.C. feedback is provided by a resistor 138 coupled between the joined emitters of transistors 134 and 136 and the emitter of transistor 130. Transistors 130–136 and related components form a conventional class B audio power amplifier.

Audio output signals at the joined emitters of transistors 134 and 136 are applied by a coupling capacitor 140 to an audio output transformer 142. The secondary winding of the transformer drives the voice coil 150a of a speaker 150.

The embodiment of FIG. 8 has been built and tested using a 1:1 turn ratio transformer 142 with an 8Ω voice coil resistance speaker or a 16Ω voice coil resistance speaker. It was found that the 8Ω speaker provided the desired break frequency of approximately 2140 Hz for proper de-emphasis. However, the 16Ω speaker was found to be more efficient, and produced the most sound power output for a given input signal. The characteristics of the transformer were measured, and the transformer was found to have a leakage inductance ($l_p + l_s$) of approximately 1.65 millihenries. The transformer also exhibited a primary winding resistance of 10Ω and a secondary winding resistance of 4Ω, both in series with the speaker impedance. The 16Ω speaker used in an Onkyo speaker, model S9T4108AA, having a voice coil inductance ($l_{v.c.}$) of approximately 0.5 millihenries. Inserting these values into equation (1) gives:

$$f_2 = (16\Omega + 10\Omega + 4\Omega)/2\pi(1.65 + 0.5) \times 10^{-3} \text{ henries} 32\ 2220 \text{ Hz}$$

Listening tests have demonstrated that the use of the above de-emphasis break frequency of 2220 Hz provides excellent wideband audio response in the constructed system.

What is claimed is:

1. Audio signal processing apparatus responsive to a source of carrier waves frequency modulated in accordance with audio signals occupying a given frequency band and subject to a preemphasis increasing with frequency over a given high frequency portion of said band comprising:

an FM detector responsive to said modulated carrier waves for recovering said pre-emphasized audio signals therefrom;

a load circuit including a loudspeaker voice coil, and having a response characteristic exhibiting a response which declines with increasing frequency over at least a segment of said high frequency portion of said band, said loudspeaker voice coil contributing significantly to said response characteristic and which decline is complementary to the preemphasis of said audio signals over said band segment; and audio signal processing means, having an input coupled to said detector to receive said recovered preemphasized audio signals, for providing an amplified version of said audio signals to said load circuit substantially without disturbance of said preemphasis over said band segment.

2. The audio signal processing apparatus of claim 1, wherein said load circuit response characteristic exhibits a break frequency, above which said complementary response decline is exhibited, which break frequency substantially corresponds to the lower frequency boundary of said given band portion.

3. The audio signal processing apparatus of claim 1, wherein said load circuit response characteristic exhibits a break frequency, above which said complementary response decline is exhibited, which break frequency substantially corresponds to a break frequency above which said audio signals exhibit said increasing preemphasis.

4. The audio signal processing apparatus of claim 1, wherein said audio signal processing means includes a de-emphasis network exhibiting a response decline with increasing frequency confined to a region of said given band portion outside said band segment.

5. The audio signal processing apparatus of claim 4, wherein said de-emphasis network comprises a filter exhibiting a response decline over said region of said given band portion which is complementary to the pre-emphasis of said audio signals over said region.

6. The audio signal processing apparatus of claim 5, wherein said audio signal processing means includes an audio signal path, and said filter comprises a first resistor in series with said path and the series combination of a capacitor and a second resistor coupled in shunt with said path.

7. The audio signal processing apparatus of claims 2, 3, or 4, wherein said load circuit includes an audio output transformer having a primary winding coupled to receive said amplified version of said audio signals and a secondary winding coupled across said voice coil, said transformer exhibiting leakage inductance of sufficient magnitude relative to the impedance exhibited by said voice coil to locate the break frequency of said response characteristic, above which said complementary response decline is exhibited, at a frequency which substantially corresponds to the lower frequency boundary of said band segment.

8. The audio signal processing apparatus of claims 2, 3, or 4, wherein said load circuit includes an audio output transformer having a primary winding coupled to receive said amplified version of said audio signals and a secondary winding coupled across said voice coil, said transformer exhibiting winding resistances and leakage inductance of sufficient magnitudes relative to the impedance exhibited by said voice coil to locate the break frequency of said response characteristic, above which said complementary response decline is exhibited, at a frequency which substantially corresponds to the lower frequency boundary of said band segment.

9. The audio signal processing apparatus of claim 7, wherein said audio signal processing means includes a lowpass filter for attenuating signals having frequencies above said given frequency band.

* * * * *